(12) United States Patent
Werner et al.

(10) Patent No.: US 9,561,556 B2
(45) Date of Patent: Feb. 7, 2017

(54) PROCESS FOR PRODUCING INTERMETALLIC WEAR-RESISTANT LAYER FOR TITANIUM MATERIALS

(71) Applicant: MTU Aero Engines AG, Munich (DE)

(72) Inventors: André Werner, Munich (DE); Bernd Daniels, Groebenzell (DE); Michael Strasser, Kleinberghofen (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 14/461,516

(22) Filed: Aug. 18, 2014

(65) Prior Publication Data

US 2015/0050511 A1 Feb. 19, 2015

(30) Foreign Application Priority Data

Aug. 19, 2013 (DE) .................. 10 2013 216 393

(51) Int. Cl.
*B23K 1/00* (2006.01)
*B23K 1/20* (2006.01)
*B23K 1/19* (2006.01)
*F01D 5/00* (2006.01)
(Continued)

(52) U.S. Cl.
CPC ............. *B23K 1/0018* (2013.01); *C23C 10/28* (2013.01); *C23C 10/30* (2013.01); *C23C 10/60* (2013.01); *C23C 24/103* (2013.01); *C23C 28/021* (2013.01); *C23C 28/022* (2013.01); *C23C 28/027* (2013.01); *F01D 5/288* (2013.01); *B23K 2201/001* (2013.01); *F05D 2230/237* (2013.01); *F05D 2300/174* (2013.01); *F05D 2300/175* (2013.01); *F05D 2300/18* (2013.01);
(Continued)

(58) Field of Classification Search
CPC .......... B32B 15/00; B32B 15/01; B32B 15/04; B32B 15/043; B32B 15/017; B32B 15/018; B32B 15/20; C23C 10/28; C23C 10/30; C23C 10/60; C23C 24/103; C23C 28/021; C23C 28/022; C23C 28/027; Y10T 428/12806; Y10T 428/12097; Y10T 428/12931; Y10T 428/1275
See application file for complete search history.

(56) References Cited

U.S. PATENT DOCUMENTS 4,725,509 A * 2/1988 Ryan .................. B23K 35/0238
228/262.72
5,077,140 A 12/1991 Luthra et al.
(Continued)

FOREIGN PATENT DOCUMENTS

DE 4112218 A1 10/1991
DE 102011101576 A1 11/2012
(Continued)

*Primary Examiner* — Michael E La Villa
(74) *Attorney, Agent, or Firm* — Abel Law Group, LLP

(57) ABSTRACT

Disclosed is a process for producing a wear-resistant layer, in particular on components of gas turbines or aero engines. The process comprises providing a component with a titanium material on at least part of a surface on which the wear-resistant layer is to be produced, applying a solder formed from a cobalt base material to the titanium material, soldering the solder to the titanium material by applying heat and producing at least one diffusion zone between solder and titanium material which comprises intermetallic phases.

20 Claims, 1 Drawing Sheet

(51) Int. Cl.
  *C23C 10/28* (2006.01)
  *C23C 10/30* (2006.01)
  *C23C 10/60* (2006.01)
  *C23C 24/10* (2006.01)
  *C23C 28/02* (2006.01)
  *F01D 5/28* (2006.01)

(52) U.S. Cl.
  CPC . *F05D 2300/506* (2013.01); *Y10T 428/12097* (2015.01); *Y10T 428/12806* (2015.01)

(56) References Cited

U.S. PATENT DOCUMENTS

| | | |
|---|---|---|
| 5,601,933 A | 2/1997 | Hajmrle et al. |
| 6,071,389 A * | 6/2000 | Zhang ................. B23K 20/021 204/298.12 |
| 6,670,049 B1 | 12/2003 | Schaeffer et al. |
| 7,093,355 B2 | 8/2006 | Gerth |
| 8,393,528 B2 | 3/2013 | Richter et al. |
| 2009/0282949 A1* | 11/2009 | Seals ................. B23K 35/325 75/302 |
| 2012/0125980 A1 | 5/2012 | Richter et al. |
| 2012/0288639 A1 | 11/2012 | Hanrieder |
| 2014/0342169 A1 | 11/2014 | Daniels et al. |

FOREIGN PATENT DOCUMENTS

| | | |
|---|---|---|
| DE | 102011087158 A1 | 5/2013 |
| EP | 2275220 A1 | 1/2011 |
| EP | 2522452 A1 | 11/2012 |
| JP | S4972143 A | 7/1974 |
| WO | 9525185 A1 | 9/1995 |
| WO | WO 2013/075688 * | 5/2013 |

* cited by examiner

PROCESS FOR PRODUCING INTERMETALLIC WEAR-RESISTANT LAYER FOR TITANIUM MATERIALS

CROSS-REFERENCE TO RELATED APPLICATIONS

The present application claims priority under 35 U.S.C. §119 of German Patent Application No. 102013216393.2, filed Aug. 19, 2013, the entire disclosure of which is expressly incorporated by reference herein.

BACKGROUND OF THE INVENTION

1. Field of the Invention

The present invention relates to a process for producing a wear-resistant layer, in particular on components of gas turbines or aero engines which are formed at least partially from a titanium material. Moreover, the present invention relates to a component of this type for gas turbines or aero engines having a corresponding wear-resistant layer.

2. Discussion of Background Information

In the case of turbomachines, such as stationary gas turbines or aero engines, components such as rotor blades, for example, are exposed to high levels of loading on account of the prevailing external ambient conditions, with high temperatures, oxidizing and corrosive media and high rates of rotation and flow, it being possible for these high levels of loading to lead inter alia to wear, in particular fatigue wear and/or abrasive wear, to the components.

This applies in particular to components which are formed from titanium materials, the main constituent of which therefore consists of titanium. The main constituent of the chemical composition in this respect is understood to mean the chemical element of which the proportion in the chemical composition corresponds in absolute terms to the greatest proportion of the material, i.e. correspondingly titanium in the case of titanium materials. Titanium materials are also understood to mean in particular materials on the basis of intermetallic compounds, for example titanium aluminides. Correspondingly, in the present disclosure an alloy consisting, for example, of identical proportions of titanium and aluminum is also subsumed under the term "titanium material".

Since the problem in relation to wear is already known for components of gas turbines or aero engines, there are various proposals in the prior art for protective layers, what are termed wear-resistant layers, which have the intention of reducing the wear to the components. In particular, a wide variety of coatings having a high hardness in order to thereby reduce the wear are known. The various wear-resistant layers can be applied to the components in different ways, for example by thermal spraying, build-up welding processes, physical vapor deposition (PVD) or chemical vapor deposition (CVD) or by build-up soldering processes. However, the solutions known to date often exhibit the problem that the adhesion, i.e. the bond of the wear-resistant layer to the base material of the component, is inadequate, and therefore the wear-resistant layer can become detached.

In addition, problems can occur when applying wear-resistant layers as a result of incompatibilities with the base material. In this respect, U.S. Pat. No. 8,393,528 B2, the entire disclosure of which is incorporated by reference herein, describes the application of a wear-resistant material, which is soldered onto a TiAl alloy in the form of a separately manufactured body in order to avoid the mixing of the TiAl alloy with the hard material alloy, for example a cobalt-chromium alloy, so as to thereby exclude brittle phases and cracking. However, a process of this type with the separate production of a wear-resistant component and the subsequent application of the component to the surface to be protected is very complex.

In view of the foregoing, it would be advantageous to have available a wear-resistant layer for titanium materials and also a corresponding production process which make it possible to achieve simple application and production of the wear-resistant layer combined with a good wear resistance and adhesion of the wear-resistant layer to the base material of the component.

SUMMARY OF THE INVENTION

The present invention provides a process for producing a wear-resistant layer on a component such as a component of a gas turbine or of an aero engine. The process comprises providing a component having a titanium material on at least part of a surface of the component on which the wear-resistant layer is to be produced, applying a solder formed from a cobalt base material to the titanium material, and soldering the solder to the titanium material by applying heat to thereby produce at least one diffusion zone between solder and titanium material, which diffusion zone comprises intermetallic phases.

In one aspect of the process, the process may further comprise removing excess solder over (on top of) the at least one diffusion zone.

In another aspect of the process, the solder may comprise hard phase particles such as, for example, particles comprising ceramic and/or intermetallic phases.

In yet another aspect of the process, the solder may be applied in the form of a paste or in the form of a semifinished product.

In a still further aspect, the solder may comprise cobalt as main constituent, and may further comprise at least one element selected from chromium, molybdenum, iron, nickel, tungsten, tantalum, titanium, zirconium, silicon.

In another aspect, the titanium material may comprise titanium as main constituent and at least one element selected from molybdenum, niobium, aluminum, boron, silicon.

In another aspect of the process of the present invention, the soldering process may be carried out at a temperature of from about 1000° C. to about 1200° C. (e.g., at a temperature of from about 1100° C. to about 1200° C. or at a temperature of from about 1150° C. to about 1200° C.) and/or with a holding time of from about 2 min to about 10 min and/or under protective gas or vacuum.

In another aspect, the at least one diffusion zone may comprises intermetallic phases based on at least one of the binary systems comprising Co—Ti, Co—Al, Ti—B, Mo—Si.

The present invention also provides a component of a gas turbine or of an aero engine. The component (which may have been produced by the process of the present invention as set forth above) comprises a titanium material on at least part of a surface of the component and a wear-resistant layer applied to the titanium material. The wear-resistant layer comprises at least one diffusion zone with a proportion of cobalt and intermetallic phases which comprise cobalt and/or titanium.

In one aspect of the component, the at least one diffusion zone may extend inward into the titanium material and/or may extend outward into a Co-containing layer.

In another aspect, the diffusion zone may comprise hard material particles therein, for example, hard material particles comprising ceramic and/or intermetallic phases.

In yet another aspect of the component, the at least one diffusion zone may comprise cobalt as main constituent, and may further comprise at least one element selected from chromium, molybdenum, iron, nickel, tungsten, tantalum, titanium, zirconium, aluminum, niobium, boron, silicon.

In a still further aspect of the component of the present invention, the at least one diffusion zone may comprise intermetallic phases based on at least one of the binary systems comprising Co—Ti, Co—Al, Ti—B, Mo—Si.

The present invention is based on the concept that the hard constituents of a wear-resistant layer which are required for the wear resistance can be produced directly during the production and application of the wear-resistant layer, and therefore the adhesive strength of the wear-resistant layer can be improved at the same time. To this end, a solder comprising a cobalt base alloy is applied to the surface, containing the titanium material, of the component to be protected and is soldered to the component, and therefore the diffusion processes which take place during the heat treatment during the soldering form at least one diffusion zone comprising intermetallic phases which have the required hardness for hard material phases in wear-resistant coatings. Correspondingly, the diffusion zone can serve at least as part of a wear-resistant layer. At the same time, a good adhesive strength is achieved by the diffusion of constituents of the solder into the titanium material and/or from the titanium material into the solder and the formation of the diffusion zone.

Similar to in the case of the titanium material, cobalt base material is understood to mean any material of which the main constituent, i.e. the constituent with the greatest proportion in the chemical composition, is cobalt. However, the cobalt solder can comprise further elements, such as chromium, molybdenum, iron, nickel, tungsten, tantalum, titanium, zirconium and silicon, the diffusion of the constituents of the solder into the titanium material and of the elements of the titanium material, for example molybdenum, niobium, aluminum, boron and silicon, from the titanium material into the solder forming intermetallic phases which are based, for example, on the binary systems Co—Ti, Co—Al, Ti—B and Mo—Si. However, the corresponding intermetallic phases can comprise not just two elements as constituents, but rather can contain additional elements. Merely the intermetallic phases which form can be based in particular in terms of crystallography on the binary systems mentioned above.

Since the diffusion zones with the intermetallic phases formed therein have the desired hardness for a wear-resistant layer, the excess solder on top of the diffusion zones can be removed after the soldering process has been carried out, and therefore the at least one diffusion zone which has formed is present as a wear-resistant layer on the surface of the correspondingly treated component.

Hard phase particles, for example ceramic and/or intermetallic phases, can additionally be provided in the solder and are incorporated in the wear-resistant layer which forms by the soldering process. By way of example, the hard phase particles can be formed by Laves phases of a hard material alloy, which can be mixed with the solder.

The solder can be applied in various forms, for example as a paste or semifinished product, in particular as what is termed solder tape, in which case the solder is present for example as a tape or plate which can be applied to the component to be coated, where it can be soldered.

The soldering process can be carried out at temperatures of 1000° C. to 1200° C., in particular 1100° C. to 1200° C., and preferably 1150° C. to 1200° C., with a holding time of 2 minutes to 10 minutes under protective gas or vacuum. In addition to complete heating of the component to be protected with the applied solder, it is also possible for provision to be made of local heating only of the soldering region or of the surface region, for example by inductive heating. The soldering process forms at least one diffusion zone on the surface of the treated component or beneath the applied solder, and in said diffusion zone there are incorporated intermetallic phases which contain cobalt and/or titanium and, depending on the composition of the titanium material and/or of the solder, can contain further chemical elements, for example chromium, molybdenum, iron, nickel, tungsten, tantalum, titanium, zirconium, aluminum, niobium, boron and/or silicon.

In particular, it is possible for a two-layer diffusion zone having a diffusion zone extending into the titanium material and a diffusion zone extending into the cobalt-containing coating to be formed, said diffusion zones arising through the diffusion into the base material of the component and from the base material of the component into the cobalt solder.

BRIEF DESCRIPTION OF THE DRAWINGS

In a purely schematic illustration, the appended drawings show, in

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
FIG. 1 a partial cross section through a component surface to be coated with an applied solder paste.

FIG. 1 shows a section through part of a surface of a component 1, in which a solder paste 2 has been applied to the surface. The component surface of the component 1 is formed from a titanium material, for example a TiAl alloy, which can comprise titanium and aluminum virtually with identical proportions as main constituents and also further alloying constituents such as niobium and molybdenum. The solder paste 2 is formed from a mixture of a cobalt base solder and hard phase particles, for example in the form of a hard material alloy. By way of example, the cobalt base solder can be formed by the alloy MAR-M-509 (trademark of Martin Marietta), which comprises 6.5% to 7.5% by weight tungsten, 3% to 4% by weight tantalum, 22.5% to 24.35% by weight chromium, 0.55% to 0.65% by weight carbon, 9% to 11% by weight nickel and also titanium and zirconium, remainder cobalt. The hard material alloy Tribaloy T-800 (trademark of Deloro Stellite Holdings Corporation) can be mixed in powder form into said cobalt alloy.

Figure 2:
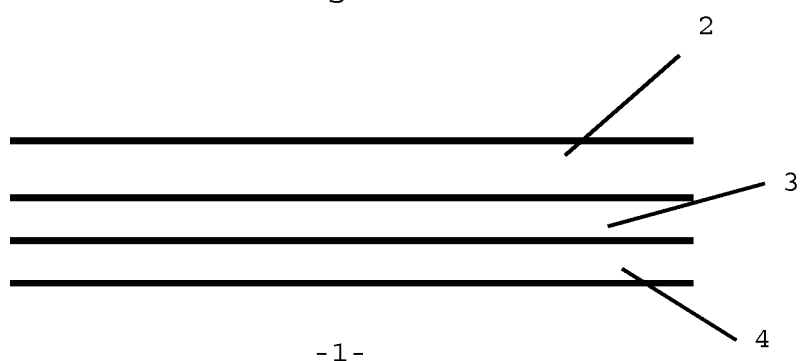
FIG. 2 a partial sectional view through the component surface shown in FIG. 1 after the soldering process has been carried out; and in FIG. 3 a partial sectional view through the component surface shown in FIGS. 1 and 2 after removal of the excess solder material, with a two-layer wear-resistant layer.

The component 1 with the solder paste 2 can be annealed under vacuum at a temperature of between about 1150° C. and about 1200° C. and with a holding duration of about 5 minutes and then rapidly cooled, so that the heat treatment gives rise to a soldering process in which the solder paste 2 is joined fixedly to the component 1 by diffusion processes. Corresponding diffusion of constituents from the component 1 into the solder paste 2 can form, as shown in FIG. 2, a diffusion zone 3, whereas diffusion of constituents of the solder paste 2 into the component 1 forms a diffusion zone 4, the diffusion zones having different chemical compositions. Thus, for example, the diffusion zone 3 may comprise about 11% by weight chromium, about 4% by weight nickel, about 13% by weight molybdenum, about 2% by weight silicon, about 13% by weight titanium, about 8% by weight aluminum and about 1% by weight niobium, remainder cobalt, whereas the diffusion zone 4 may comprise about 21% by weight chromium, about 12% by weight molybdenum, about 1% by weight silicon, about 12% by weight titanium, about 6% by weight aluminum and about 1% by weight niobium, remainder cobalt. In addition, a bonding zone which extends further into the base material of the component 1 and has small proportions of cobalt and chromium can form (not shown).

Intermetallic phases, in particular intermetallic Co—Ti phases, Co—Al phases, Ti—B phases and Mo—Si phases, are formed in the diffusion zones. These intermetallic phases, together with the incorporated hard material particles, have a high hardness and strength, and therefore the diffusion zones are resistant to abrasion and to wear.

Figure 3:
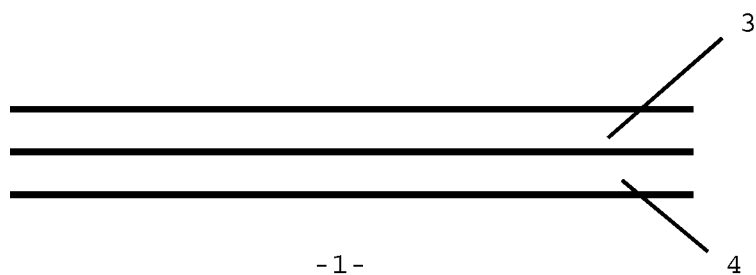

Accordingly, the wear-resistant layer is finished by removing the solder paste 2 which has remained, so that the diffusion zones 3, 4 come to lie on the surface of the correspondingly treated component 1 (see FIG. 3).

Instead of a solder paste comprising a mixture of a cobalt base solder and hard phase particles, it is also possible to provide merely a cobalt base solder without the additional incorporation of hard phase particles, since a sufficient strength and hardness and therefore wear resistance are already achieved by the intermetallic phases which form during the soldering process.

Instead of a solder paste, the solder can also be applied in a different form, for example in the form of a solder tape, i.e. a semifinished product made of the soldering material, which can additionally comprise a suitable binder to achieve the dimensional stability.

Instead of subjecting the component to be provided with the wear-resistant layer to a complete heat treatment during the soldering process, local heating in the region of the surface of the component or in the region of the applied solder may also be adequate. By way of example, the soldering process could be carried out inductively, so as not to subject the base material of the component to thermal loading.

Instead of the two diffusion zones described in the exemplary embodiment, it is also possible for merely a single homogeneous diffusion zone to be formed.

The formation of the diffusion zones on the one hand forms hard intermetallic phases which therefore increase the wear resistance and on the other hand gives rise to an intimate bond of the wear-resistant layer as a result of the interdiffusion of solder and base material of the component. Correspondingly, a good adhesive strength of the wear-resistant layer is therefore provided.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for producing a wear-resistant layer on a component, wherein the process comprises:
   providing a component which comprises a titanium material on at least part of a surface of the component on which the wear-resistant layer is to be produced,
   contacting the titanium material with a solder in the form of a paste or semifinished product formed from a cobalt base material,
   soldering the solder to the titanium material by applying heat to thereby produce one or more diffusion zones between solder and titanium material, which one or more diffusion zones comprise one or more intermetallic phases and form the wear-resistant layer, the soldering being carried out at a temperature of from about 1100° C. to about 1200° C.

2. The process of claim 1, wherein the component is a component of a gas turbine or of an aero engine.

3. The process of claim 1, wherein the process further comprises removing excess solder present on top of the one or more diffusion zones, whereby the wear-resistant layer is present on the surface of the correspondingly treated component.

4. The process of claim 1, wherein the solder comprises hard phase particles.

5. The process of claim 4, wherein the hard phase particles comprise ceramic and/or intermetallic phases.

6. The process of claim 1, wherein the solder is employed in the form of a paste.

7. The process of claim 1, wherein the solder is employed in the form of a semifinished product.

8. The process of claim 7, wherein the semifinished product is a solder tape.

9. The process of claim 1, wherein in addition to cobalt the solder comprises one or more elements selected from chromium, molybdenum, iron, nickel, tungsten, tantalum, titanium, zirconium, and silicon.

10. The process of claim 1, wherein the titanium material comprises titanium as main constituent and one or more elements selected from molybdenum, niobium, aluminum, boron, silicon.

11. The process of claim 1, wherein soldering is carried out at a temperature of from about 1100° C. to about 1200° C. with a holding time of from about 2 min to about 10 min and/or under protective gas or vacuum.

12. The process of claim 1, wherein soldering is carried out at a temperature of from about 1150° C. to about 1200° C.

13. The process of claim 1, wherein at least one of the one or more diffusion zones comprises one or more intermetallic phases based on one or more of the binary systems Co-Ti, Co—Al, Ti—B, and Mo—Si.

14. The process of claim 1, wherein the cobalt based solder is formed from an alloy which comprises from 6.5% to 7.5% by weight tungsten, from 3% to 4% by weight tantalum, from 22.5% to 24.35% by weight chromium, from 0.55% to 0.65% by weight carbon, from 9% to 11% by weight nickel as well as titanium and zirconium, remainder cobalt.

15. The process of claim 1, wherein the wear-resistant layer comprises at least two diffusion zones, one diffusion zone comprising about 11% by weight chromium, about 4% by weight nickel, about 13% by weight molybdenum, about 2% by weight silicon, about 13% by weight titanium, about 8% by weight aluminum and about 1% by weight niobium, remainder cobalt, and another diffusion zone comprising about 21% by weight chromium, about 12% by weight molybdenum, about 1% by weight silicon, about 12% by weight titanium, about 6% by weight aluminum and about 1% by weight niobium, remainder cobalt.

16. A process for producing a wear-resistant layer on a component, wherein the process comprises:

providing a component which comprises a titanium material on at least part of a surface of the component on which the wear-resistant layer is to be produced, contacting the titanium material with a solder in the form of a paste or semifinished product formed from a cobalt base alloy which comprises from 6.5% to 7.5% by weight tungsten, from 3% to 4% by weight tantalum, from 22.5% to 24.35% by weight chromium, from 0.55% to 0.65% by weight carbon, from 9% to 11% by weight nickel as well as titanium and zirconium, remainder cobalt, soldering the solder to the titanium material by applying heat to thereby produce one or more diffusion zones between solder and titanium material, which one or more diffusion zones comprise one or more intermetallic phases and form the wear-resistant layer.

17. The process of claim 16, wherein the wear-resistant layer comprises at least two diffusion zones, one diffusion zone comprising about 11% by weight chromium, about 4% by weight nickel, about 13% by weight molybdenum, about 2% by weight silicon, about 13% by weight titanium, about 8% by weight aluminum and about 1% by weight niobium, remainder cobalt, and another diffusion zone comprising about 21% by weight chromium, about 12% by weight molybdenum, about 1% by weight silicon, about 12% by weight titanium, about 6% by weight aluminum and about 1% by weight niobium, remainder cobalt.

18. The process of claim 16, wherein soldering is carried out at a temperature of from about 1150° C. to about 1200° C.

19. A process for producing a wear-resistant layer on a component, wherein the process comprises:

providing a component which comprises a titanium material on at least part of a surface of the component on which the wear-resistant layer is to be produced, contacting the titanium material with a solder in the form of a paste or semifinished product formed from a cobalt base material, soldering the solder to the titanium material by applying heat to thereby produce at least two diffusion zones between solder and titanium material, one diffusion zone comprising about 11% by weight chromium, about 4% by weight nickel, about 13% by weight molybdenum, about 2% by weight silicon, about 13% by weight titanium, about 8% by weight aluminum and about 1% by weight niobium, remainder cobalt, and another diffusion zone comprising about 21% by weight chromium, about 12% by weight molybdenum, about 1% by weight silicon, about 12% by weight titanium, about 6% by weight aluminum and about 1% by weight niobium, remainder cobalt, which at least two diffusion zones comprise one or more intermetallic phases and form the wear-resistant layer.

20. The process of claim 19, wherein soldering is carried out at a temperature of from about 1150° C. to about 1200° C.

* * * * *